United States Patent [19]

Field, Jr.

[11] Patent Number: 4,493,168
[45] Date of Patent: Jan. 15, 1985

[54] CALIBRATION GAUGE FOR COMPUTER-CONTROLLED LENS GENERATOR, OR THE LIKE

[75] Inventor: Edgar L. Field, Jr., Muskogee, Okla.

[73] Assignee: Coburn Optical Industries, Inc., Muskogee, Okla.

[21] Appl. No.: 505,020

[22] Filed: Jun. 16, 1983

[51] Int. Cl.³ .............................................. B24B 49/10
[52] U.S. Cl. ............................. 51/165.87; 33/172 E; 33/174 P; 51/124 L; 51/165.71; 51/277
[58] Field of Search ............. 33/172 E, 169 B, 174 P; 51/165.88, 165 R, 165.71, 277, 124 L

[56] References Cited

U.S. PATENT DOCUMENTS

| | | | |
|---|---|---|---|
| 2,117,221 | 5/1938 | Simpson | 51/277 |
| 2,130,575 | 9/1938 | Adams | 51/277 |
| 2,286,319 | 6/1942 | Sauskes | 51/277 |
| 2,913,829 | 11/1959 | Arlin | 33/177 E |
| 3,069,818 | 12/1962 | Atols | 51/277 |
| 3,670,460 | 6/1972 | Oldfield | 51/165.71 |
| 3,913,274 | 10/1975 | Raiford | 51/165.71 |
| 4,295,301 | 10/1981 | Barth | 51/165.88 |
| 4,352,245 | 10/1982 | Hennessy | 33/169 B |

FOREIGN PATENT DOCUMENTS 481021 2/1938 United Kingdom ............. 51/165.88

*Primary Examiner*—Harold D. Whitehead

[57] ABSTRACT

A computer-controlled lens generating arrangement (1) has a calibration gauge (14) mountable on a lens chuck (28) and moveable into a calibration position for detecting a worn or eroded condition of a tool (18). When a worn or eroded condition of tool (18) is detected, data are provided to a computer (60) which recomputes positioning data for the chuck (28), and repositioning of the chuck (28), as well as the angle of the cutting tool (18), takes place.

30 Claims, 9 Drawing Figures

CALIBRATION GAUGE FOR COMPUTER-CONTROLLED LENS GENERATOR, OR THE LIKE

DESCRIPTION

1. Technical Field

The present invention relates to a calibration gauge for a computer-controlled lens generating arrangement, or the like, and more particularly to a calibration gauge which is mountable on a lens chuck in the lens generating arrangement so that the calibration gauge is moveable into a calibration position with respect to a grinding tool so as to provide, to the computer, data signals indicating needed corrective repositioning of the lens chuck in order to compensate for detected wear of the grinding tool.

2. Background Art

The art of preparing ophthalmic lenses from glass blanks entails two major processes. First, the lens blanks are surface ground with a prescriptive front and back curvature to provide a desired optic quality or characteristic, and thus enhance the vision of an ultimate wearer. Secondly, the lenses are ground to a desired edge shape to fit a preselected frame. Additionally, the peripheral edge surface of the lens is typically beveled or finished to cooperate with a reciprocal bevel on an interior peripheral surface of a frame in order to hold the lenses within the frame.

More specifically, in the formation of an ophthalmic lens, a lens disc or blank is first molded from any optical medium, such as glass or plastic. This blank is typically fashioned with a convex surface on one side and a concave surface on the other. In order to process the lens to a desired prescriptive value, the lens is then mounted upon a lens generator where a rotating grinding cup, mounted at an angle to a tangent of the lens, is swept across the lens to produce a toroidal surface of compound prescriptive value. Such a lens generating arrangement is, for example, disclosed in the following U.S. Pat. Nos.: Coburn—2,086,327; Suddarth—3,449,865; and Suddarth et al—3,458,956 (each of which is assigned to the assignee of the present invention).

Following the initial lens generating operation, the ophthalmic lens is fined and polished to a final prescriptive value, such as is disclosed in Stith U.S. Pat. No. 3,732,647. Left and right lenses are then mounted on an edge grinding machine to cut the outer peripheral shape required of the lens in order to be compatible with eye glass frames. In this connection, edging machines such as discussed above are disclosed in the following U.S. Pat. Nos.: Grey et al—3,121,979; Novak—3,555,739; Haddock—4,027,434; and Haddock—4,203,259 (each of which is assigned to the assignee of the present invention). Finally, the lens edge surfaces may be fine polished or honed so as to be smooth and free from scratches and/or other aberrations.

In each of the above-discussed processing operations, it is desirable to bathe the working member (the grinding tool) and the lens surface with copious quantities of a coolant and/or abrasive working solution. In the past, coolant has been typically delivered to a working zone by a plurality of tubular conduits with or without nozzles. Such a coolant distribution system is, for example, disclosed in Suddarth U.S. Pat. No. 3,466,811, which is assigned to the assignee of the present invention.

Operators of such lens generating arrangements are demanding tighter tolerances with regard to the finished lens, and accordingly the erosion of the cutting tool or grinding tool is one of the main items or factors being scrutinized. Wear or erosion of the grinding tool must be corrected or allowed for if the integrity of the finished lens or finished product is to be maintained. In prior art arrangements, such as disclosed in Watanabe et al U.S. Pat. No. 4,214,191 and in the other patents described above, when the grinding tool becomes worn or eroded, the tool must be removed, retrued, reinstalled and recalibrated. In areas of large production, it may be necessary to repeat this four-step procedure two or more times a day. Obviously, this results in significant loss in production time and in efficiency of the overall operation, and a more efficient alternative is very desirable.

Other prior art arrangements of background interest are disclosed in Rice et al U.S. Pat. No. 3,181,401 and Evans et al U.S. Pat. No. 3,211,896.

DISCLOSURE OF INVENTION

The present invention relates to the provision of a calibration gauge in a computer-controlled lens generating arrangement, or the like, for generating a finished lens having desired parameters.

More specifically, the invention pertains to the provision of a calibration gauge which is mountable on a lens chuck so as to be moveable into a calibration position with respect to a grinding tool, the calibration gauge providing data signals indicating correcting repositioning of the lens chuck and associated assembly in order to compensate for detected wear of the grinding tool.

As a result of implementation of the above-described calibration gauge in a computer-controlled lens generating arrangement, a significant advantage over arrangements of the prior art is achieved. That is, whereas arrangements of the prior art were such as to require that an eroded or worn tool be removed, retrued, reinstalled and recalibrated periodically (as much as two or more times a day in high-production applications), in accordance with the present invention, wearing or erosion of the grinding tool is detected merely by placing the overall arrangement in the "calibration" mode so that, when the calibration gauge is moved into a calibration position with respect to the grinding tool, data signals are provided to the computer associated with the computer-controlled lens generating arrangement, and appropriate calculations are made in order to control the corrective repositioning of the lens chuck and associated assembly in order to compensate for wear of the grinding tool.

Therefore, it is a primary object of the present invention to provide a calibration gauge for a computer-controlled lens generating arrangement, or the like.

It is an additional object of the present invention to provide a calibration gauge which is mounted on a lens chuck so that the tool does not have to be removed when it becomes worn or eroded.

It is an additional object of the present invention to provide a calibration gauge which generates, and transmits to a computer, data signals indicating needed corrective repositioning of the lens chuck in order to compensate for wear of the grinding tool.

With the above and other objects in mind, as will hereinafter appear, the invention will be more fully described and understood by reference to the detailed description below and the accompanying drawings.

BEST MODE FOR CARRYING OUT THE INVENTION

The invention will now be described in more detail with reference to the various figures of the drawings.

Figure 1:
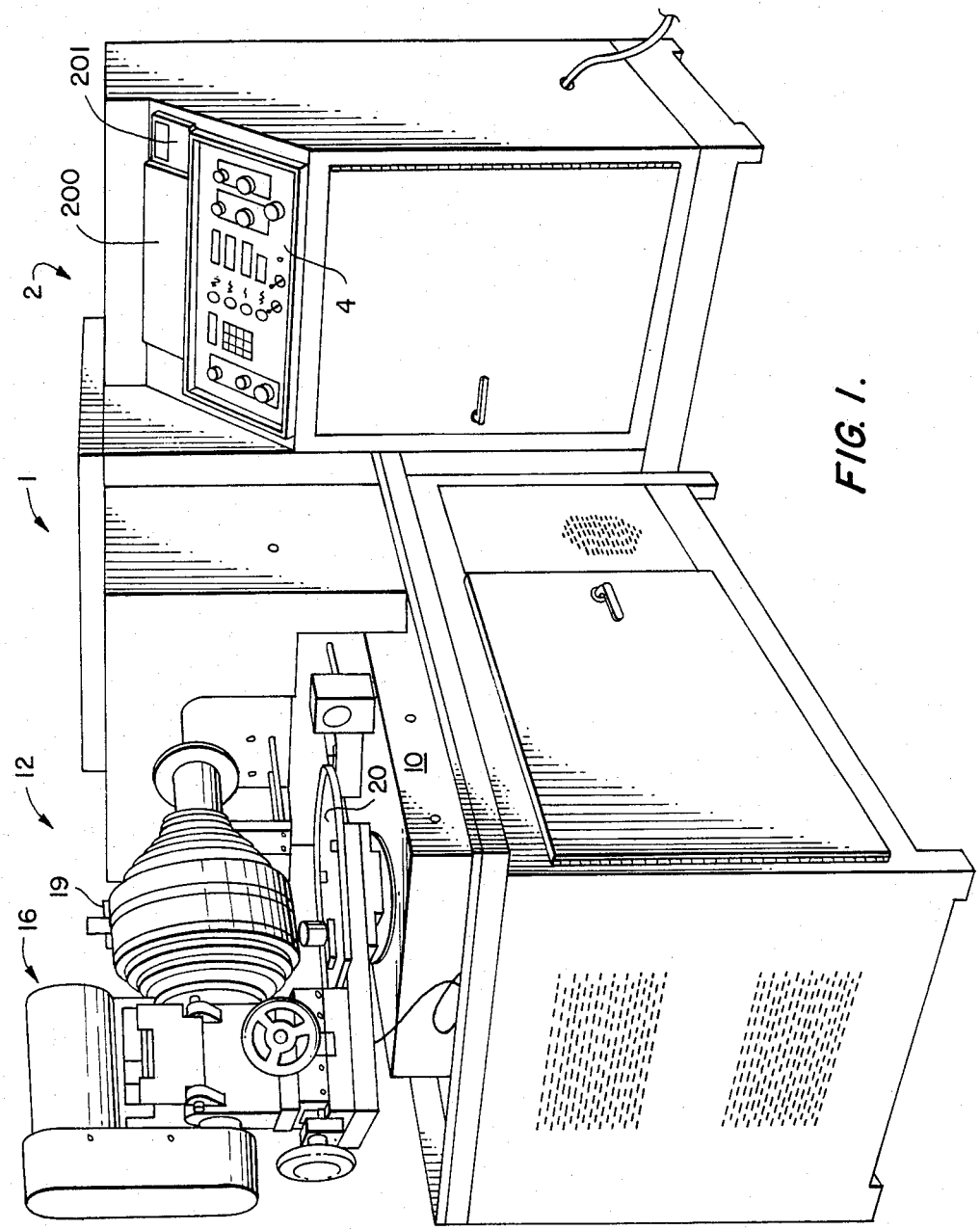
FIG. 1 is a perspective view of a computer-controlled lens generating arrangement with which the calibration gauge of the present invention is typically employed (other arrangements can also be employed).

FIG. 1 is a perspective view of the lens generating arrangement with which the calibration gauge of the present invention is utilized. As seen in FIG. 1, the lens generating arrangement 1 generally comprises a console section 2, a lens holding assembly 11, a grinding tool assembly 12, and a drive motor assembly 16.

The console section 2 includes a control panel 4 made up of the various control switches and display indicators utilized by the operator to operate the lens generating arrangement. Console section 2 also includes panels 200 and 201. Parameters such as cutter diameter, blank size, amount per cut and backcut thickness are entered on panel 200, while diamond motor overload is set on panel 201. As indicated in FIG. 1, panel 200 consists of covered switches. Panel 200 also includes a calibrate-/normal switch (not shown), the function of which is discussed in more detail below.

The lens holding assembly 11 comprises various elements (to be described subsequently) for holding the lens during the fabrication procedure, and for controlling the movement of the lens with respect to the grinding tool.

The grinding tool assembly 12 basically comprises a grinding tool (not shown in FIG. 1) surrounded by a splash hood 19 which serves as a shield when the lens is in the working position and is being fabricated (ground) by the grinding tool.

The drive motor assembly 16 is mounted on a grinding assembly base 20, and serves to drive the grinding tool during fabrication of the lens.

In general terms, the computer-controlled lens generating arrangement 1 has the capability of complete and instantaneous control, via a builtin computer, of every operation necessary to produce an ophthalmic lens. As will be seen in more detail below, desired lens curves can be entered and displayed on the control console 4. In addition, lens thickness can be entered and displayed on the control console 4. A further control feature enables the "back cutting" mode to be entered in cycle or eliminated by console operation. Console operation also permits duplication of a lens by the mere touching of a button, and variation of sweep speed.

In accordance with a primary feature of the invention, electronic gauging of the grinding tool via the calibration gauge (not shown in FIG. 1) permits measurement of the wear or erosion of the diamond-cutting edge of the grinding tool, such information being transmitted to the computer. As a result, control signals are provided by the computer to the lens holding assembly 11 so as to provide compensation for wear or erosion of the grinding tool, such compensation being in the form of corrective repositioning of the grinding tool relative to the lens being fabricated.

Figure 2A:
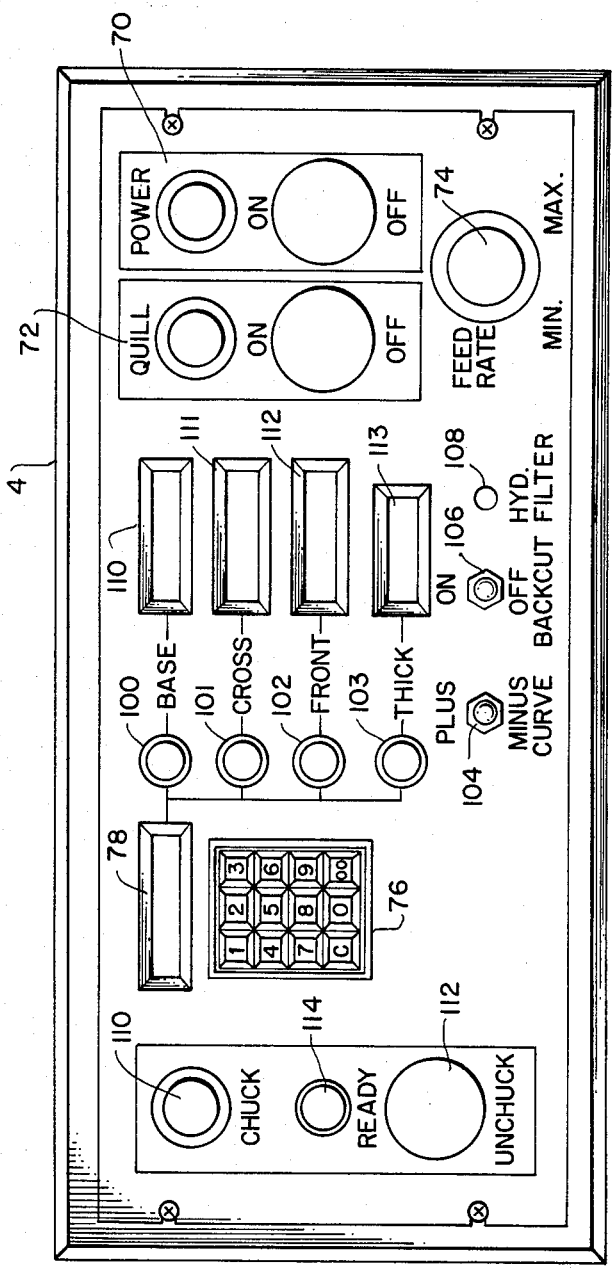
FIG. 2A is a representation of the control panel of the computer-controlled lens generating arrangement.

FIG. 2A is a diagrammatic representation of the control console 4 contained in the console section 2 of FIG. 1. As seen in FIG. 2, the control panel 4 comprises the following elements: power on/off controls 70, quill on/off controls 72, feed rate control 74, a 12-digit keyboard 76, a keyboard display 78, data transfer controls 100-103, data display devices 110-113, plus/minus curve control 104, backcut on/off control 106, hydraulic fluid filter contamination indicator light 108, chuck control 110, unchuck control 112, and "ready" indicator 114.

Power on/off controls 70 are utilized by the operator to "power up" or "power down" the lens generating arrangement or system.

Quill on/off controls 72 are utilized by the operator to activate or deactivate the "quill" function. As is well-known to those of skill in the art, the cutting diamond is referred to as a "quill". Thus, activation of the quill involves starting the motor (in drive motor assembly 16) to turn the diamond which cuts the medium in the desired form. Deactivation of the quill involves turning off the motor so as to cease cutting.

The feed rate control 74 is a knob-like control utilized to adjust feed rate of the grinding tool relative to the lens being fabricated, between a minimum and a maximum value of feed rate. The value of feed rate which is set by means of control 74 is related to "sweep speed". Sweep speed governs the rate at which the radius arm of the lens generating arrangement (generally shown in FIG. 1) moves. Thus, feed rate is a constant, front panel setting (set via control 74) for any curve being cut. If a long radius curve is being implemented in the lens generating arrangement, the feed rate would be set high for a given sweep speed, as opposed to the feed rate setting for a short radius curve.

The keyboard 76 is a 12-digit keyboard utilized to enter data concerning desired lens measurements into the system, such data being displayed on the keyboard display 78.

Data transfer controls 100-103 are controls utilized to transfer data from the keyboard display 78 to a selected one of the data displays 110-113 associated with the individual controls 100-103, respectively. Thus, if the operator utilizes keyboard 76 to enter a base curve measurement for the lens into display 78, further actuation of data transfer control 100 will transfer this base curve measurement from display 78 into base measurement display 110. The same holds true for entry and transfer of cross curve measurement data, front curve measurement data and thickness data.

Plus/minus curve control 104 is a toggle-type switch utilized to designate plus or minus curves with regard to the data being entered via the keyboard 76. Thus, if the operator is entering plus curve data via the keyboard 76, the control switch 104 is placed in the uppermost position, while if the operator is entering negative curve data via keyboard 76, the control switch 104 is placed in the lowermost position.

Backcut on/off control 106 is a toggle-type switch utilized to select the "backcut" mode of operation. Thus, in the upper position, control switch 106 indicates that the operator desires to enter the "backcut" mode of operation. A few words of explanation relative to the "backcut" mode of operation now follow, with reference to FIG. 2B.

In the process of cutting an optical medium, in particular glass which is quite brittle, a breaking problem occurs on the final cut of a thin lens. That is, when the lens is being cut, it is not totally supported. Hence, when the cut is started, a thick medium is encountered, even where the lens is not supported. When the cut progresses past the center of the lens and outwardly, that part of the lens which is thin is eventually encountered, a relatively thick uncut portion being still supported. The forces encountered in cutting the remaining portion invariably result in breaking of the lens.

However, if we proceeded to the opposite side of the lens, which is thick, and backcut the lens to a thickness of approximately 0.25 to 0.50 mm. of the final thickness, to a point past the support of the lens, and then went back to the other side of the lens and made a final cut, the very thin final cut near the end of the cut would not produce breaking stresses in the lens.

Figure 2B:
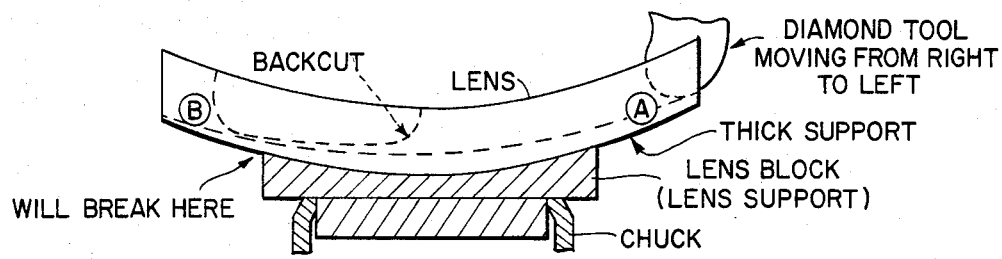
FIG. 2B is a representation of a lens, used to explain the "backcut" mode of operation.

Referring to FIG. 2B, if a cut is made from point A to point B, the region surrounding point A is thick at the beginning and remains supported by a thick part of the lens toward the center thereof. Progressing past the center of the lens, the portion adjacent to point B is cut, first at the support, with the remaining portion adjacent to point B being supported by a thin part of the lens. By using the "backcut" mode of operation, this breaking problem is relieved.

Hydraulic fluid filter contamination indicator light 108 is utilized to indicate when the hydraulic filter needs to be changed.

Chuck control 110 is utilized by the operator to clamp the blocked lens and to move the lens-holding chuck into the working position, while unchuck control 112 is utilized to move the lens-holding chuck out of the working position and release the blocked lens. The "ready" indicator 114 indicates to the operator that the "setup" data has been entered and is valid, and then the lens-holding chuck is ready to accept a lens such that fabrication of the lens can begin.

Figure 2C:
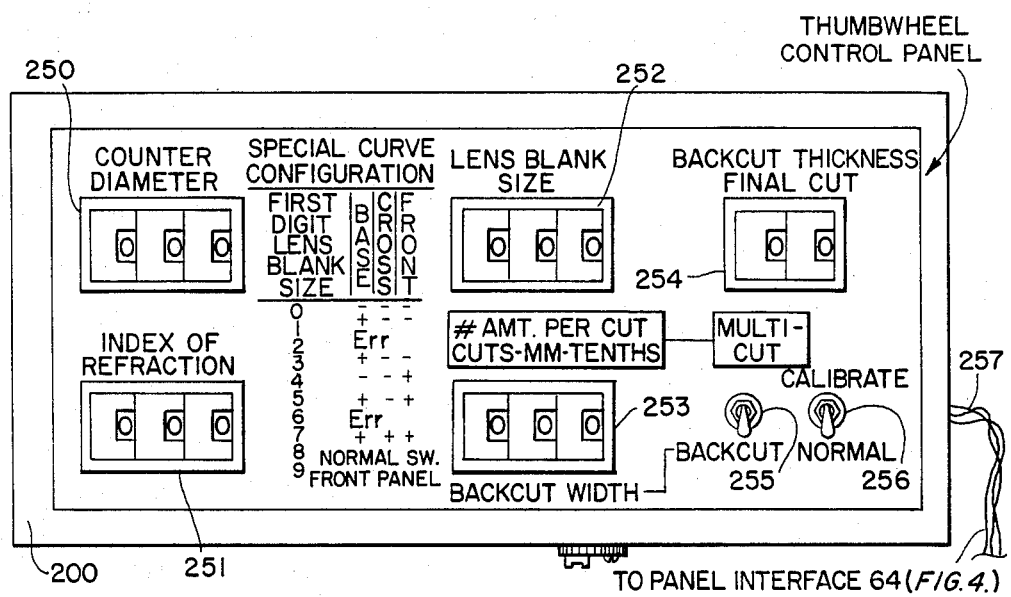
FIG. 2C is a detailed diagram of the panel 200 of the control console section of FIG. 1.

FIG. 2C is a more detailed diagram of the panel 200 (known as the thumbwheel control panel) of the overall control panel or console section 2 of FIG. 1. As seen in FIG. 2C, the thumbwheel control panel 200 contains thumbwheel switches 250-254 for setting the cutter diameter, index of refraction, lens blank size, backcut width, and backcut thickness final cut, respectively. The panel 200 also includes a toggle switch 255 for selecting between "multi-cut" and "backcut" modes of operation, and a further toggle switch 256 for selecting between the "calibrate" and "normal" modes of operation. An output cable 257 carries the entered data from the control panel 200 to a panel interface 64 (FIG. 4), as will be discussed below.

Figure 3:
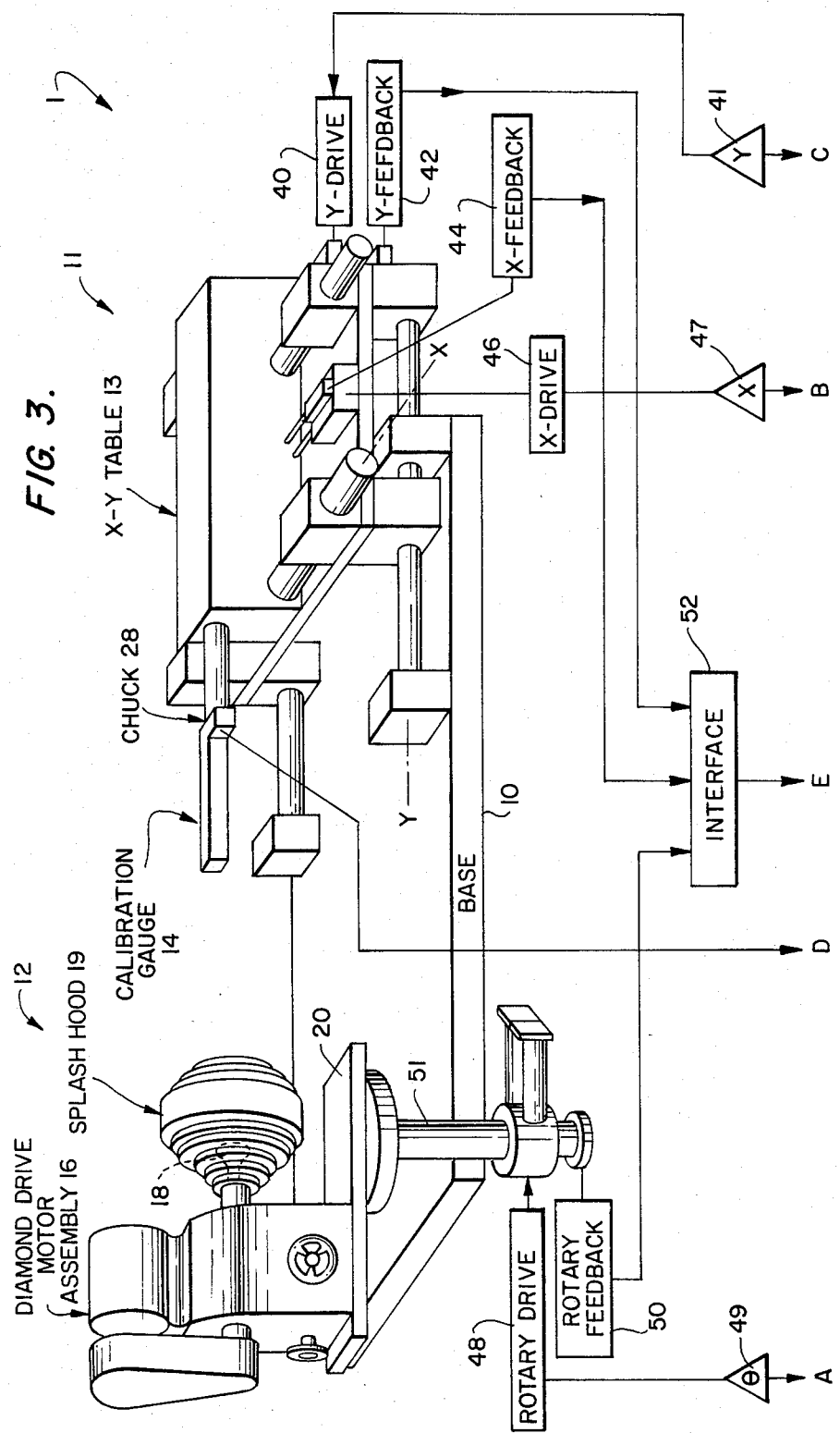
FIG. 3 is a more detailed diagrammatic representation of the computer-controlled lens generating arrangement.

FIG. 3 is a diagrammatic representation, in somewhat more detail, of the lens generating arrangement 1 with which the calibration gauge of the present invention is or may be generally utilized.

As seen in FIG. 3, the lens generating arrangement 1 comprises lens-holding assembly 11, which in turn comprises an X-Y table 13 to which the lens chuck 28, which holds the lens to be fabricated, is connected. X-Y table 13 is connected to X-drive stage 46 and Y-drive stage 40, from which it receives X-drive and Y-drive command signals for moving the chuck 28 (and lens carried thereby) in accordance with an X-Y coordinate system, toward the grinding tool assembly 12. X-drive stage 46 and Y-drive stage 40 receive input signals B and C, respectively, via respective amplifiers 47 and 41 from the computer (not shown) associated with the computer-controlled lens generating arrangement 1.

Conversely, the X-Y table 13 provides X-feedback and Y-feedback signals to the computer via feedback stages 44 and 42 respectively, and interface 52 (output E thereof).

As mentioned earlier, at certain time intervals (for example, after fabrication of a predetermined number of lens), it is desirable to check the grinding tool (indicated by reference numeral 18), located inside of the splash hood 19 of the grinding tool assembly 12, for wear and erosion. In that case, calibration gauge 14 is mounted on the chuck 28. As will be seen in more detail below, during the calibration procedure, calibration gauge 14 provides a calibration output signal D to the computer (not shown).

Further referring to FIG. 3, the grinding tool assembly 12 basically comprises a grinding tool 18 disposed within the splash hood 19, both of these elements being connected to a diamond drive motor assembly 16, the latter being mounted on a grinding assembly base 20. Angular or arc-like rotation of the grinding tool 18 (referred to as a "quill" above) with respect to the lens carried by chuck 28 during fabrication is accomplished by means of rotary drive stage 48 in response to reception of computer-generated rotary control input A, received via amplifier 49. In response thereto, rotary drive stage 48 actuates rotary shaft 51 to accomplish the desired angular or arc-like rotation of the driving tool 18. A rotary feedback signal is detected by rotary feedback stage 50, which is connected to the rotary shaft 51, and the rotary feedback signal generated by rotary feedback stage 50 is provided, via interface 52 (output E thereof), to the computer.

It is to be understood that the X-Y table 13 can be any electrically or hydraulically driven mechanical assembly for moving a chuck bidirectionally, as would be obvious to one of skill in the art. However, it is to be noted that the calibration gauge of the present invention can be utilized on other lens generating arrangements, such as the so-called "radius arm generators" and other non-bidirectional arrangements.

The X-feedback and Y-feedback stages 44 and 42, as well as the technique employed for obtaining the X and Y feedback signals, are considered to be conventional and well known to those of skill in the art. Accordingly, no further disclosure thereof is deemed to be necessary.

Rotary drive stage 48 is a conventional element which is responsive to the computer-generated rotary drive input A to drive the rotary shaft 51, thus imparting rotary motion to the base 20 and tool 18. The tool 18 is, or course, driven by the diamond drive motor assembly 16. Rotary feedback stage 50 is a conventional element utilized to detect the rotary motion of the shaft 51, base 20 and tool 18, and provides a corresponding rotary feedback signal to the computer via interface 52 (output E).

Of course, it should be noted that the manner of moving rotary drive stage 48 and the associated feedback technique can be any conventional technique known to those of skill in the art. For example, a dual hydraulic cylinder could be employed to drive a sprocket chain around the rotary shaft 51, and a rotary potentiometer (corresponding to element 50) can be utilized to detect position. A rotary incremental encoder or absolute encoder could also be utilized.

Another arrangement might employ a single hydraulic cylinder connected to a rack and pinion system, and feedback would be obtained via a linear potentiometer. In short, any of a number of different drives (hydraulic or even electric drives) can be used to accomplish rotary motion without departing from the scope of the present invention.

Figure 4:
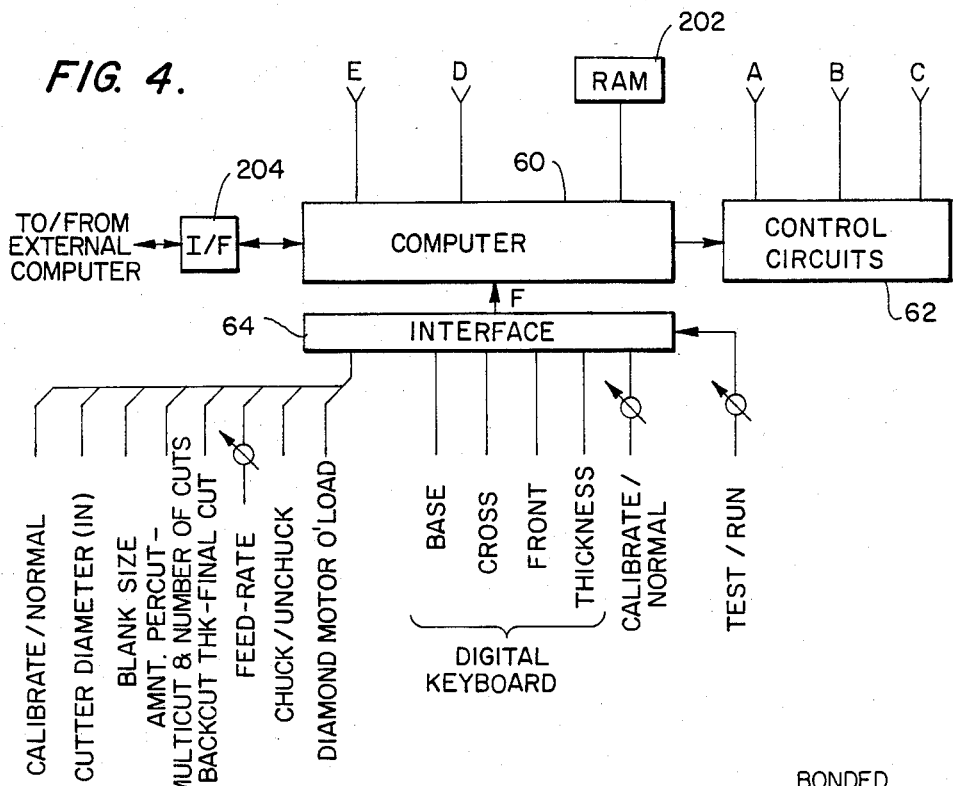
FIG. 4 is a block diagram depicting the computer, control circuits and panel interface employed in the computer-controlled lens generating arrangement.

FIG. 4 is a diagrammatic representation of the computer 60, control circuits 62 and panel interface 64 of the present invention.

Computer 60 receives calibration feedback data D from calibration gauge 14 of FIG. 3, and also receives X, Y and rotary feedback data E from the interface 52 of FIG. 3, and can be any conventional microprocessor or mini-computer capable of process control operations of the type described above. In a preferred embodiment, the computer 60 can be implemented by a microcomputer system comprising an 8080 microprocessor-based system distributed over three printed circuit boards on a multi-bus configuration.

The central board, or central processing unit (CPU), is implemented by an Intel SBC 80/10 microprocessor board designed for OEM applications, and incorporates an Intel 8080 eight-bit microprocessor operating at 1 MHz. It has 1K of random access memory (RAM), sockets for 4K of read-only memory (ROM) using Intel 2708 EPROM's (programmable read-only memories), six 8-bit parallel I/O ports, and an RS232C serial communication port.

The second board functions as a 4K ROM expansion, again using Intel 2708 EPROM's and interface circuitry for both keyboard and display units. This board also incorporates digital-to-analog and servo control circuitry for control of mechanical positioning.

The third board functions as interface for the thumbwheel switches 250–254 (FIG. 2C) used to provide I/O ports with associated decoding logic, and additional digital-to-analog and servo control circuitry for control of mechanical positioning.

Finally, it is preferable to employ a computer having self-testing provisions and utilizing a minimum of plug-in boards (generally, four or less) so that the units may be serviced in the field by semi-skilled maintenance personnel.

The panel interface 64 is a conventional keyboard or console panel interface, and receives data entered via the digital keyboard 76 of FIG. 2, and pertaining to the desired measurements of the base curve, cross curve, front curve and lens thickness.

Alternatively, the panel interface 64 may be "downloaded" with such data from a mainframe (external) computer via a conventional communications interface 204 by simply entering a code or job number. The panel interface 64 also receives calibrate/normal and test/run selection data inputs from the console 4 of FIG. 2. Selection between the "calibrate" and "normal" modes of operation takes place, as previously mentioned, utilizing toggle switch 256 of control panel 200 in console section 4 of FIG. 1. The test/run selection may be derived from a switch (settable by the operator) located, for example, on a card cage which holds the printed circuit boards associated with the computer 60 (FIG. 4).

Finally, the panel interface 64 receives other data pertaining to cutter diameter, lens blank size, amount per cut and number of cuts (multi-cut), backcut width (backcut), thickness/final cut feed rate, and a chuck/unchuck selection input from the console 4 of FIG. 2. Data pertaining to diamond motor overload are received from console panel 201.

The computer 60, in response to the abovedescribed data, provides control outputs to the control circuits 62. The control circuits 62 are conventional computer-activated control circuits which generate outputs A, B, and C which are provided to the rotary drive stage 48, the X-drive stage 46 and the Y-drive stage 40, respectively, of FIG. 3. For example, control circuits 62 can be implemented by use of a bidirectional servo valve that controls hydraulic actuators (cylinder-piston). The servo valve is electrically controlled via an electronic amplifier driver or electronic amplifier drivers. Feedback data are generally provided by a precision potentiometer, the output of which is summed with the set-point data.

Figure 5B:
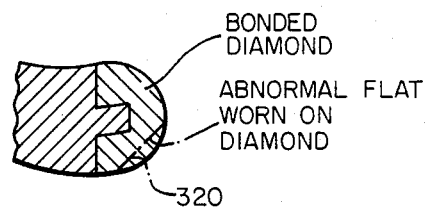
FIG. 5B is a representation of a diamond cup wheel and cutting diamond, used to explain the "calibrate" mode of operation.
Figure 5A:
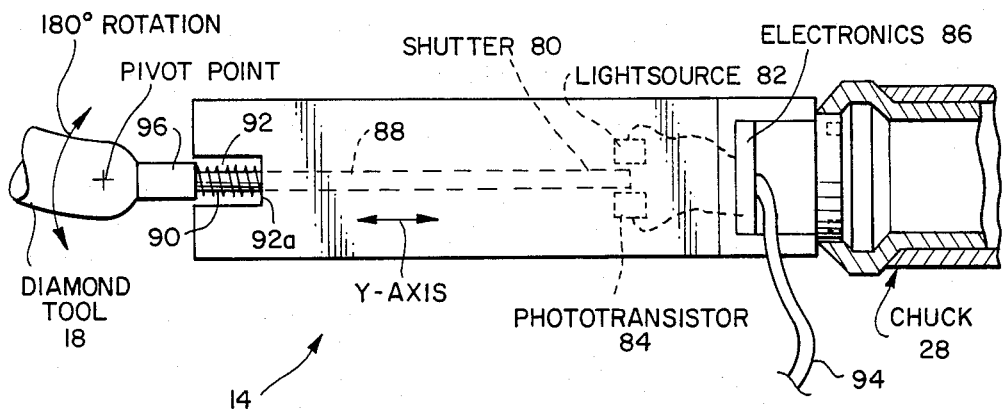
FIG. 5A is a diagrammatic representation of the calibration gauge of the present invention.

FIG. 5A is a diagrammatic representation of the calibration gauge 14 of the present invention. As seen in FIG. 5A, the calibration gauge 14 basically comprises a shutter 80, light source 82, phototransistor 84, electronics section 86, shaft 88, spring-like element 90, and a cable 94 providing electrical communication between the electronics section 86 and the input D of the computer 60 of FIG. 4. The shutter 80 may also take the form of a variable density shutter, incremental encoder, or absolute encoder.

It should be noted that the calibration gauge 14 has one end which is mountable on the chuck 28, and has a recess 92 formed at the other end (proximate the tool 18 in the calibration mode). The shaft 88 extends from a point between the light source 82 and phototransistor 84, at one end, to the recess 92, at the other end, and has a front portion 96 disposed at that end of the shaft 88 most proximate the tool 18. Furthermore, the spring 90 is concentrically disposed about that end of the shaft 88 so that, when compressed, it provides a spring-like force directed from the inner wall 92a of the recess 92 toward the front portion 96.

When the calibrate/normal switch 256 (FIG. 2C) is placed in the "calibrate" mode, the tool 18 is moved through an arc of 180° or less in 125 discrete steps, and 125 corresponding data samples are stored in the computer 60 (FIG. 4). The computer 60 uses these data samples to recompute the positions of the X-Y table 13 (FIG. 3). Repositioning data B and C are, accordingly, transmitted via amplifiers 47 and 41 (respectively) to X and Y drive stages 46 and 40 (respectively), and the chuck 28 is repositioned (adjusted as to its position) accordingly by X-Y table 13.

The calibration gauge 14 is so dimensioned that rotation of the tool 18 in an arc-like manner about the front portion 96 will, when the tool 18 is unworn, result in movement of the front portion 96 and shaft 88 in the rightward direction (along the Y-axis shown in FIG. 5A), as a result of which the shaft 88 will interrupt the light path between the light source 82 and the phototransistor 84. In a conventional manner, the electronics 86 will detect this light interruption and provide a corresponding data input D to the computer 60 of FIG. 4.

When the tool 18 is sufficiently worn, rotation of the tool 18 about the front portion 96 of the gauge 14 will result in different movement or relatively slight movement of the portion 96 and shaft 88, as a result of which light will travel in an uninterrupted manner between the source 82 and the phototransistor 84. Again, in a conventional manner, the electronics 86 will detect this uninterrupted travel of light, and will send a different corresponding input D to the computer 60 of FIG. 4.

In response to detection of a "worn" condition, the computer 60 will, as described elsewhere in this disclosure, provide chuck control signals to move the chuck 28 so that the shaft 88 is repositioned to cause interruption of light passing between light source 82 and phototransistor 84. This repositioning of the chuck 28 causes adjustment in the position of the lens relative to the diamond tool 18 during the grinding phase, thus compensating for wear of the tool 18.

As indicated in the above discussion, the electronics 86 can be implemented by any electronic or electric circuitry capable of detecting passage or non-passage of light between light source 82 and phototransistor 84, and providing appropriate or corresponding signals, via cable 94, to computer 60 (FIG. 4).

The calibration procedure will now be further described, with reference to FIG. 5B. When the calibration gauge 14 is plugged into the chuck 28, and when the calibrate/normal switch 256 is in the "calibrate" position, the computer 60 is ready to accept diamond wear data after the gauge 14 is chucked. It should be noted that, during this operation, "quill" power is "off".

Data accumulated during the calibration procedure is stored in random access memory (RAM) 202 of FIG. 4, and is used by the computer 60 to calculate new diamond angles and V-position in order to compensate for wear of the diamond. Wear is not necessarily symmetrical and, in most cases, the diamond actually has a flat zone, as indicated by reference numeral 320 in FIG. 5B. Regardless of the type of wear, calculations are made to correct any abnormality.

In a preferred embodiment of the invention, the "calibrate" mode of operation is entered semi-automatically when the main power is turned on. The computer 60 looks for a switch closure that occurs when a slide is manually locked, and then the computer 60 senses whether the calibration gauge is plugged into its receptacle. If these conditions prevail, then the gauge 14 can be chucked and the diamond will "step around" the calibration gauge feeler (front portion) 96 (see FIG. 5A). In this manner, wear data is gathered for storage in the RAM 202 (FIG. 4).

Figure 6:
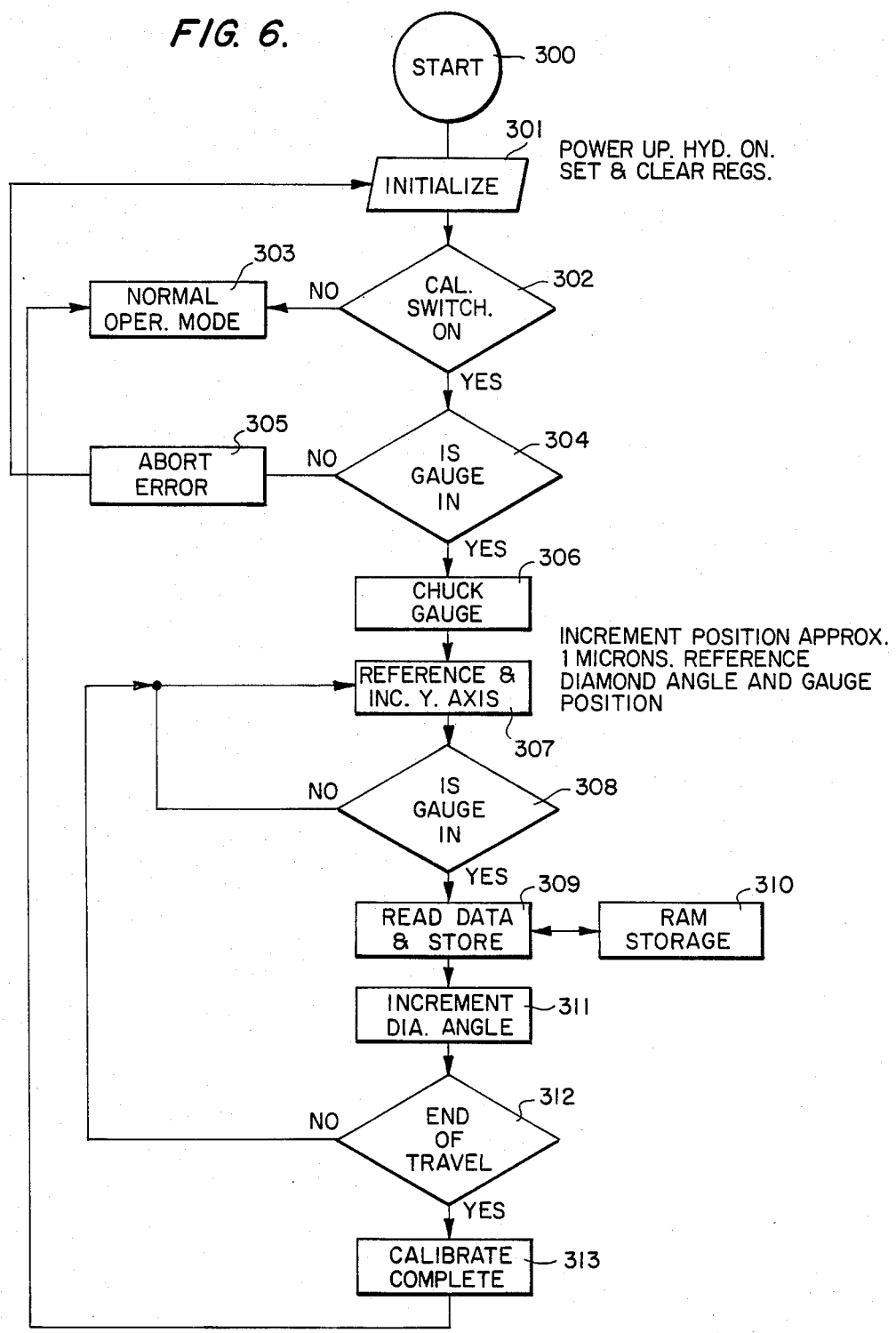
FIG. 6 is a flowchart of operations performed by the computer 60 of FIG. 4.

FIG. 6 is a flowchart of the operations performed by the computer 60 of FIG. 4.

As seen in FIG. 6, at the start of operations (block 300), initialization procedure (block 301) is carried out, including the performance of power-up functions, turn on of the hydraulics, and setting and clearing of appropriate registers. A decision is then made as to whether or not the calibrate/normal switch 256 is set to calibrate (block 302).

If not set to the calibrate mode of operation, normal operational mode commences (block 303). If the system is set to the calibrate mode of operation, a further decision as to whether or not the gauge is in place is made (block 304).

If the gauge is not in place, an abort error routine (block 305) is initiated, followed by repetition of the initialization process (block 301). If the gauge is in place, chucking of the gauge takes place (block 306), followed by a "reference & inc. Y axis" procedure (block 307), during which incrementing of the gauge position by approximately ten microns takes place, and the reference diamond angle and gauge position are obtained.

A further decision is then made, as to whether or not the gauge is in place (block 308). If not, a return to the "reference & inc. Y axis" procedure (block 307) is executed. If the gauge is in place, data is read and stored (block 309) in random access memory (RAM) storage 202 provided in association with the computer 60 (see FIG. 4) (block 310).

Then, the diamond angle is incremented (block 311), and a further decision, as to whether or not "end of travel" has been reached, is made (block 312).

If "end of travel" has not been reached, a return to "reference & inc. Y axis" procedure (block 307) is executed. If "end of travel" has been reached, calibration is complete (block 313), and normal operational mode can be executed (block 303).

While preferred forms and arrangements have been shown in illustrating the invention, it is to be clearly understood that various changes in detail and arrangement may be made without departing from the spirit and scope of this disclosure.

I claim:

1. In a computer-controlled lens generating arrangement for generating a finished lens having desired parameters, comprising:
   holding means for holding a lens to be ground,
   grinding means for grinding said lens to generate said finished lens, and
   control means for generating electrical control signals in accordance with said desired parameters to actuate said grinding means to generate said finished lens,
   said grinding means comprising a grinding tool which is prone to become worn;
   a calibration gauge having means for mounting in said holding means for providing data signals indicating needed corrective repositioning of said holding means in order to compensate for wear of said grinding tool.

2. In the arrangement of claim 1, comprising further control means for moving the lens in an X-Y plane to generate curves having curve radii which are infinite.

3. In the arrangement of claim 1, wherein said calibration gauge comprises an elongate device having a lengthwise axis extending between said grinding tool and said holding means, said elongate device including a shaft disposed along said lengthwise axis, said shaft having an end portion arranged to be contacted by said grinding tool whereupon said shaft is moved along said lengthwise axis toward said holding means by a distance inversely proportional to a degree of wear of said grinding tool, said calibration gauge further comprising detecting means for detecting when said distance through which said shaft moves is less than a predetermined distance, whereby to detect when the degree of wear of said grinding tool exceeds a predetermined amount.

4. In the arrangement of claim 3, wherein said detecting means comprises a light source and a phototransistor disposed on opposite sides of said lengthwise axis so that said shaft, when moved, intrudes therebetween to a degree inversely proportional to the degree of wear of said grinding tool.

5. In the arrangement of claim 4, wherein said holding means repositions said gauge when the degree of wear of said grinding tool exceeds said predetermined amount, whereby said shaft is repositioned to intrude between said light source and said phototransistor to such a degree as to block passage of light therebetween.

6. In the arrangement of claim 3, wherein said end portion of said shaft is larger in cross-sectional diameter than the remainder of the shaft, said elongate device including a housing in which said shaft is carried, said housing having a recessed portion into which said shaft and said end portion thereof extend, said recessed portion including a wall disposed in a plane perpendicular to said lengthwise axis, said wall being discontinuous around said lengthwise axis to form an aperture through which said shaft moves.

7. In the arrangement of claim 6, wherein said gauge includes spring means extending between said wall and said end portion so as to impart a spring-like force between said end portion and said grinding tool when said end portion contacts said grinding tool.

8. In the arrangement of claim 7, wherein said spring means comprises a helical spring concentrically disposed around said shaft adjacent to said end portion, and having a diameter less than the diameter of said end portion but greater than the diameter of the remainder of the shaft.

9. A calibration gauge for use in a computer-controlled lens generating arrangement, said arrangement including holding means for holding a lens to be ground and a tool for grinding said lens to provide a finished lens;
wherein said calibration gauge includes means for mounting in said holding means so as to be moveable into a calibration position with respect to said tool;
said calibration gauge comprising detecting means for detecting a worn condition of said tool, and generating means for generating data signals indicating needed corrective repositioning of said holding means, when said holding means is holding said lens to be ground, in order to compensate for said worn condition of said tool.

10. The gauge of claim 9, wherein said calibration gauge comprises an elongate device having a lengthwise axis extending between said grinding tool and said holding means, said elongate device including a shaft disposed along said lengthwise axis, said shaft having an end portion arranged to be contacted by said grinding tool whereupon said shaft is moved along said lengthwise axis toward said holding means by a distance inversely proportional to a degree of wear of said grinding tool, said detecting means detecting when said distance through which said shaft moves is less than a predetermined distance, whereby to detect when the degree of wear of said grinding tool exceeds a predetermined amount.

11. The gauge of claim 10, wherein said detecting means comprises a light source and a phototransistor disposed on opposite sides of said lengthwise axis so that said shaft, when moved, intrudes therebetween to a degree inversely proportional to the degree of wear of said grinding tool.

12. The gauge of claim 11, wherein said holding means repositions said gauge when the degree of wear of said grinding tool exceeds said predetermined amount, whereby said shaft is repositioned to intrude between said light source and said phototransistor to such a degree as to block passage of light therebetween.

13. The gauge of claim 10, wherein said end portion of said shaft is larger in cross-sectional diameter than the remainder of the shaft, said elongate device including a housing in which said shaft is carried, said housing having a recessed portion into which said shaft and said end portion thereof extend, said recessed portion including a wall disposed in a plane perpendicular to said lengthwise axis, said wall being discontinuous around said lengthwise axis to form an aperture through which said shaft moves.

14. The gauge of claim 13, wherein said gauge includes spring means extending between said wall and said end portion so as to impart a spring-like force between said end portion and said grinding tool when said end portion contacts said grinding tool.

15. The gauge of claim 14, wherein said spring means comprises a helical spring concentrically disposed around said shaft adjacent to said end portion, and having a diameter less than the diameter of said end portion but greater than the diameter of the remainder of the shaft.

16. In a computer-controlled machining arrangement for machining a workpiece into a finished product having desired parameters, comprising:
holding means for holding the workpiece to be machined,
machining means for machining the workpiece to provide said finished product, and
control means for generating electrical control signals in accordance with said desired parameters to actuate said machining means to provide said finished product,
said machining means comprising a tool which is prone to become worn;
a calibration gauge having means for mounting in said holding means for providing data signals indicating needed corrective repositioning of said holding means in order to compensate for wear of said tool.

17. In the arrangement of claim 16, comprising further control means for moving the lens in an X-Y plane to generate curves having curve radii which are infinite.

18. In the arrangement of claim 16, wherein said calibration gauge comprises an elongate device having a lengthwise axis extending between said tool and said holding means, said elongate device including a shaft disposed along said lengthwise axis, said shaft having an end portion arranged to be contacted by said tool whereupon said shaft is moved along said lengthwise axis toward said holding means by a distance inversely proportional to a degree of wear of said tool, said calibration gauge further comprising detecting means for detecting when said distance through which said shaft moves is less than a predetermined distance, whereby to detect when the degree of wear of said tool exceeds a predetermined amount.

19. In the arrangement of claim 18, wherein said detecting means comprises a light source and a phototransistor disposed on opposite sides of said lengthwise axis so that said shaft, when moved, intrudes therebetween to a degree inversely proportional to the degree of wear of said tool.

20. In the arrangement of claim 19, wherein said holding means repositions said gauge when the degree of wear of said grinding tool exceeds said predetermined amount, whereby said shaft is repositioned to intrude between said light source and said phototransistor to such a degree as to block passage of light therebetween.

21. In the arrangement of claim 18, wherein said end portion of said shaft is larger in cross-sectional diameter than the remainder of the shaft, said elongate device including a housing in which said shaft is carried, said housing having a recessed portion into which said shaft and said end portion thereof extend, said recessed portion including a wall disposed in a plane perpendicular to said lengthwise axis, said wall being discontinuous around said lengthwise axis to form an aperture through which said shaft moves.

22. In the arrangement of claim 21, wherein said gauge includes spring means extending between said wall and said end portion so as to impart a spring-like force between said end portion and said tool when said end portion contacts said tool.

23. In the arrangement of claim 22, wherein said spring means comprises a helical spring concentrically disposed around said shaft adjacent to said end portion, and having a diameter less than the diameter of said end portion but greater than than the diameter of the remainder of the shaft.

24. A calibration gauge for use in a computer-controlled machining arrangement, said arrangement including holding means for holding a workpiece to be machined and a tool for machining said workpiece to provide a finished product;
   wherein said calibration gauge includes means for mounting in said holding means so as to be moveable into a calibration position with respect to said tool;
   said calibration gauge comprising detecting means for detecting a worn condition of said tool, and generating means for generating data signals indicating needed corrective repositioning of said holding means, when said holding means is holding said workpiece, in order to compensate for said worn condition of said tool.

25. The gauge of claim 24, wherein said calibration gauge comprises an elongate device having a lengthwise axis extending between said tool and said holding means, said elongate device including a shaft disposed along said lengthwise axis, said shaft having an end portion arranged to be contacted by said tool whereupon said shaft is moved along said lengthwise axis toward said holding means by a distance inversely proportional to a degree of wear of said tool, said detecting means detecting when said distance through which said shaft moves is less than a predetermined distance, whereby to detect when the degree of wear of said tool exceeds a predetermined amount.

26. The gauge of claim 25, wherein said detecting means comprises a light source and a phototransistor disposed on opposite sides of said lengthwise axis so that said shaft, when moved, intrudes therebetween to a degree inversely proportional to the degree of wear of said grinding tool.

27. The gauge of claim 26, wherein said holding means repositions said gauge when the degree of wear of said grinding tool exceeds said predetermined amount, whereby said shaft is repositioned to intrude between said light source and said phototransistor to such a degree as to block passage of light therebetween.

28. The gauge of claim 25, wherein said end portion of said shaft is larger in cross-sectional diameter than the remainder of the shaft, said elongate device including a housing in which said shaft is carried, said housing having a recessed portion into which said shaft and said end portion thereof extend, said recessed portion including a wall disposed in a plane perpendicular to said lengthwise axis, said wall being discontinuous around said lengthwise axis to form an aperture through which said shaft moves.

29. The gauge of claim 28, wherein said gauge includes spring means extending between said wall and said end portion so as to impart a spring-like force between said end portion and said tool when said end portion contacts said tool.

30. The gauge of claim 29, wherein said spring means comprises a helical spring concentrically disposed around said shaft adjacent to said end portion, and having a diameter less than the diameter of said end portion but greater than the diameter of the remainder of the shaft.

* * * * *